April 13, 1926.

R. J. SMITH

FISH LANDING NET

Filed Dec. 28, 1925

1,580,543

Inventor
R. J. Smith,
By Clarence A. O'Brien
Attorney

Patented Apr. 13, 1926.

1,580,543

UNITED STATES PATENT OFFICE.

ROY J. SMITH, OF WARRENTON, OREGON.

FISH-LANDING NET.

Application filed December 28, 1925. Serial No. 78,040.

*To all whom it may concern:*

Be it known that I, ROY J. SMITH, a citizen of the United States, residing at Warrenton, in the county of Clatsop and State of Oregon, have invented certain new and useful Improvements in a Fish-Landing Net, of which the following is a specification.

This invention has reference to fish landing nets, and has more particular reference to that type of net that is adapted to be employed by fishermen in order that the fish may be caught in the net prior to bringing the same entirely out of the water, which is a necessary expedient in the catching of weak mouthed fish.

The primary object of the invention is to substantially improve upon the type of landing net now employed by fishermen. In the type of net now being universally used, it is necessary that the same be placed under the surface of the water primarily at a point remote from the fish upon the end of the line, after which the fisherman must, with caution, move the net toward the fish and there beneath, and then while the fish is upon the line, quickly move the net upwardly to the proper catching of the fish. In the use of a net of this character it frequently happens that unskilled fishermen will strike the fish before engaging the same within the net, which will knock the fish from the line and permit of his escape.

In attaining my improvement my net is so constructed that the same may be engaged over the line that is out of the water, and then slowly moved downwardly simultaneously with the upward movement of the line, and then as the fish is directly beneath the net, the same may be quickly slipped over and the fish caught within the net without requiring great skill, means being provided for permitting of the ready disengagement of the hook from the fish's mouth, and also from within the net, wherein the fish is caught, thus making it unnecessary for the fisherman to place one or both of his hands within the net for disengagement of the hook from the fish's mouth, which is another disadvantage in the use of the nets now upon the market.

From the foregoing and other objects in view, as the nature of the invention will be better understood, the same comprises the novel form, combination and arrangement of parts hereinafter more fully described, shown in the accompanying drawing and claimed.

In the drawing wherein like reference characters indicate corresponding parts throughout the several views.

Figure 1:
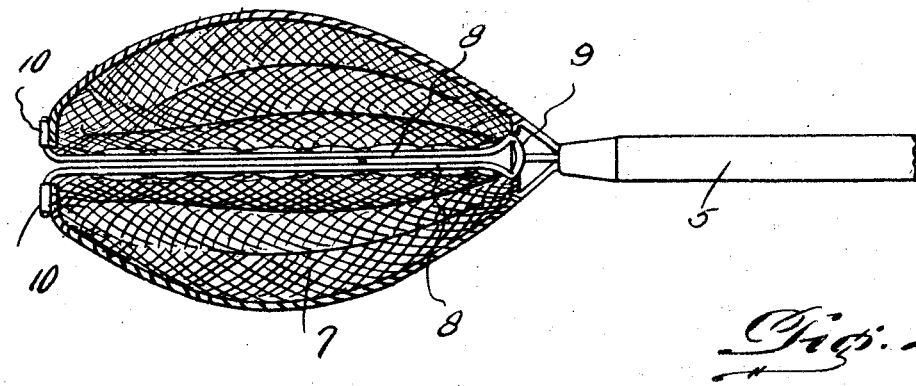
Figure 1 is a bottom plan view of a net constructed in accordance with my invention, said net being maintained in this position while the same is being moved into engagement with the line and downwardly thereon toward the fish.

Now having particular reference to the drawing, my novel net constitutes the provision of a suitable handle 5, upon one end of which is arranged in a horizontal manner a wire frame 6, preferably of the oval formation as shown in Figure 1, the front end of the frame being open as shown in Figure 1, said frame carrying the usual net 7.

In carrying out my invention, the front side of the net 7 is opened throughout its entire length, while the bottom thereof is also open for a purpose hereinafter described.

The edges of the net at the open side thereof, and open bottom are secured to the spaced parallel legs 8—8 of a single piece of wire that is bent upon itself to provide a member of the shape shown in Figure 1. The joining portion of the legs at the rear end thereof is bent rearwardly to provide an eyelet 9, around which are attached the edges of the bottom opening in said net. The upper ends of said legs are pivotally secured within eyes 10—10 provided upon the forward side of the frame 6 at the opening in said forward side.

Figure 3:
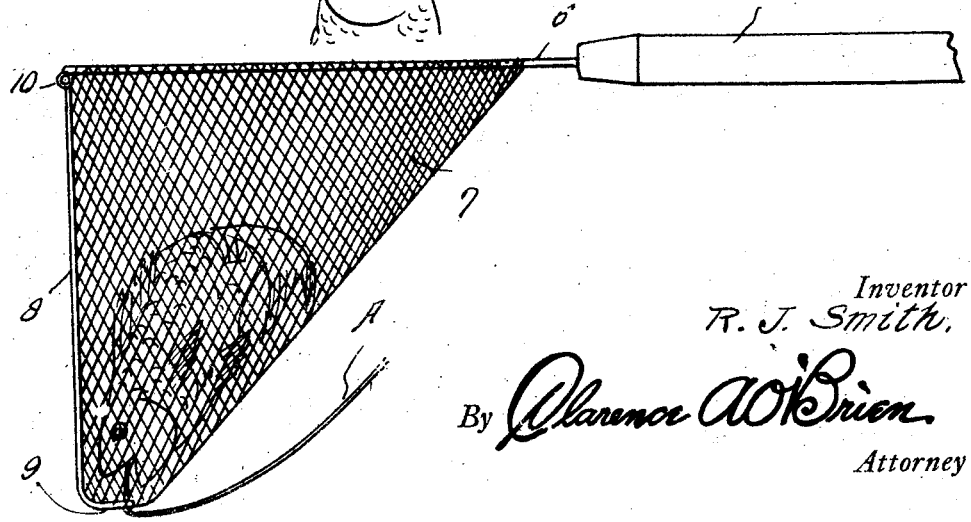
Figure 3 is a side elevation of the net, in fish-landed condition.

The object of this wire member is to provide a line receiving slot at the front side of the net 7, while the bent providing the eyelet 9 constitutes a means at the lower end of the slot whereby the hook within the fish's mouth, that is caught within the net as shown in Figure 3, may be removed by jerking upon the line which is designated A in the figures.

Figure 2:
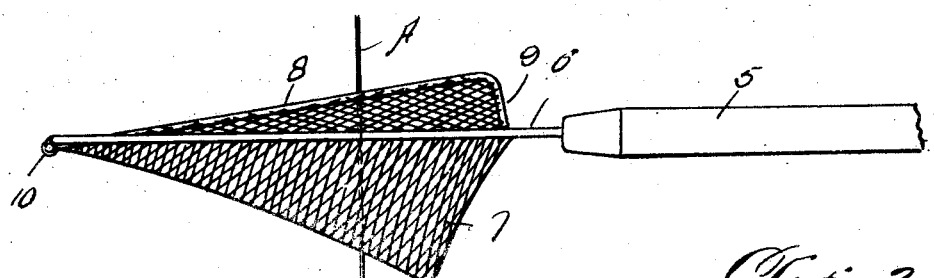
Figure 2 is a side elevation of the net when the same is used.

In the use of my improved net, the open side thereof is reversed at which position, the wire member including said legs 8—8 will fall downwardly upon the net carrying frame 5, as shown in Figures 1 and 2. Obviously when a fish is caught upon the line the same may be passed into the net through the medium of the slot provided at its forward side. The net is then slowly moved downwardly until it reaches the position with respect to the fish, as shown in Figure 2, after which the net is scooped under the fish and then quickly raised, thereby effectively catching the fish without touching the same until it has been engaged in the net, resulting in an accurate landing, and this without requiring any great skill upon the part of the fisherman. By jerking upon the line A, the hook will be readily withdrawn from the weak mouth fish, and then the same will drop through the eyelet 9 in the lower portion of the frame.

It will thus be seen that I have provided a novel and efficient form of fish landing net that is well adapted for all the purposes designated, even though I have herein shown and described the preferred embodiment of the invention with which I am at this time familiar, it is nevertheless to be understood that modifications may be had without departing from the spirit and scope of the appended claims.

Having thus described the invention, what I claim as new and desire to secure by Letters Patent is:—

1. A fish landing net of the character described, a handle, a frame upon one end of the handle, a net secured to the frame, the front side thereof being opened for producing a slot therein, and a reinforcing frame for said slot.

2. In a fish landing net of the character described, a handle member, a net upon one end of the handle member, the same being provided with a relatively vertical opening when extended for permitting a fish line to pass into the net when collapsed and reinforcing means for said opening.

3. In a fish landing net of the character described, a handle member, a frame upon one end of the handle member, a net associated with the frame, said net being provided with a relatively vertical opening throughout its length and registering with an opening in said carrying frame in order that a fish line may pass into the net when the same is collapsed, and a reinforcing member for said opening in order that the line will be properly guided into the net when so collapsed.

4. In a fish landing net of the character described, a handle member, a frame upon one end of the handle member, a net associated with the frame, said net being provided with a relatively vertical opening throughout its length and registering with an opening in said carrying frame in order that a fish line may pass into the net when the same is collapsed, and a reinforcing member for said opening in order that the line will be properly guided into the net when so collapsed, said opening and reinforcing member being so constructed at certain ends thereof as to permit of the disengagement of the hook upon the line from the net after a fish has been caught therein.

In testimony whereof I affix my signature.

ROY J. SMITH.